United States Patent [19]
Hultgren, III et al.

[11] Patent Number: 6,128,415
[45] Date of Patent: *Oct. 3, 2000

[54] DEVICE PROFILES FOR USE IN A DIGITAL IMAGE PROCESSING SYSTEM

[75] Inventors: Bror O. Hultgren, III, Ipswich; F. Richard Cottrell, Easton; Jay E. Thornton, Watertown, all of Mass.

[73] Assignee: Polaroid Corporation, Cambridge, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/709,487

[22] Filed: Sep. 6, 1996

[51] Int. Cl.[7] .............................. G06K 9/00; G06K 9/36; G03F 3/08; G03F 3/10
[52] U.S. Cl. ........................ 382/276; 382/162; 382/167; 382/266; 345/431; 358/518; 358/527
[58] Field of Search ..................................... 382/167, 276, 382/266, 239, 162; 358/518, 527, 520; 345/418, 431

[56] References Cited

U.S. PATENT DOCUMENTS

| | | | |
|---|---|---|---|
| 5,224,177 | 6/1993 | Doi et al. | 382/266 |
| 5,257,097 | 10/1993 | Pineau et al. | 358/527 |
| 5,450,216 | 9/1995 | Kalsson | 358/518 |
| 5,572,632 | 11/1996 | Laumeyer et al. | 395/116 |
| 5,583,656 | 12/1996 | Gandhi et al. | 358/426 |
| 5,606,432 | 2/1997 | Ohtsuka et al. | 358/527 |
| 5,615,282 | 3/1997 | Spiegel et al. | 382/276 |
| 5,634,092 | 5/1997 | Stokes | 345/418 |
| 5,646,752 | 7/1997 | Kohler et al. | 358/520 |
| 5,668,890 | 9/1997 | Winkelman | 382/167 |
| 5,682,442 | 10/1997 | Johnston et al. | 382/239 |
| 5,694,484 | 12/1997 | Cottrell et al. | 382/167 |
| 5,838,333 | 11/1998 | Matsuo | 345/431 |
| 5,881,209 | 3/1999 | Stokes | 358/504 |

OTHER PUBLICATIONS

Murch "New Paradigms for Visualization," IEEE. pp. 550–551, 1990.
ICC Profile Format Specification, Version 3.10b, Oct. 21, 1995.

*Primary Examiner*—Andrew J. Johns
*Assistant Examiner*—Daniel G. Mariam
*Attorney, Agent, or Firm*—Robert J. Decker

[57] ABSTRACT

Device profiles conventionally describe properties of a device or element within a digital image processing system that capture, transform or render color components of an image. An improved device profile includes both chromatic information and spatial characteristic information. The device profile is generated by use of both chromatic and spatial characteristic functions within a model based image processing system to predict both color and spatial characteristics of a processed image. The device profile generally includes: first data for describing a device dependent transformation of color information content of the image; and second data for describing a device dependent transformation of spatial information content of the image. In a special case, the device profile could contain only spatial characteristic information.

33 Claims, 3 Drawing Sheets

DEVICE PROFILES FOR USE IN A DIGITAL IMAGE PROCESSING SYSTEM

BACKGROUND OF THE INVENTION

1. Field of the Invention

This invention is directed generally towards digital image processing and more specifically towards generation and use of an improved device profile for describing both spatial and color properties of a device within an image processing system, so that a processed image can be more accurately captured, transformed or rendered.

2. Description of the Prior Art

Digital image processing involves electronically capturing an image of a scene, altering the captured image in some desired fashion and passing the altered image to an output device. An upstream element of a digital image processing system can be thought of as a source device, whereas a downstream element can be thought of as a destination device. For instance, a simple image processing system could include an acquisition device such as a digital camera, camcorder, scanner, CCD, etc., a color processor for processing the colors of the image, and an output device, such as a printer, monitor, computer memory, etc. When considering a communication between the acquisition device and the color processor, the acquisition device is deemed as the source device whereas the color processor is deemed as the destination device. When considering a communication between the color processor and the output device, the color processor is deemed as the source device whereas the output device is deemed as the destination device.

All imaging devices, either image acquisition or image display, will impose distortions of the color and spatial components of the image data.

Historically, industry has chosen to correct these distortions with device dependent solutions. It is common practice in the industry that an integral part of the design and calibration of such devices is the characterization of these distortions in the image data and modifications of the design of the devices to ameliorate these distortions. For example, electronic peaking filters are often employed in video capture devices to correct for the blurring effects of anti-aliasing filters and amplifier frequency response. Electronic imaging devices are commonly designed to function with specific upstream (in the case of display devices) or downstream (in the case of image sources) devices to provide quality images. For example, image capture devices commonly transform the image digits to compensate ('gamma corrected') for the CRT volts-luminance characteristics of CRT displays. Such design considerations provide a device dependent model for that specific implementation of an image processing system, but do not provide the same degree of image quality when substituting an alternative device.

Recently, device independent paradigms for the characterization of color information in an image processing system have been developed and are being implemented: Color Sync, developed by Apple Computer and KCMS, developed by Eastman Kodak Co., are examples of systems or components supporting a device independent color paradigm. This paradigm is based upon a characterization of the image pixel data (digits) in a device independent color space—e.g. CIE L*a*b* or CIE XYZ, and the use of a Color Management System. The characterization of a device's image pixel data in device independent color space is commonly codified in a tagged file structure, referred to as a device profile, that accompanies the digital imaging device. However, the spatial characteristics of digital imaging devices are still modified in the context of the device dependent model described above.

In order to improve processing flexibility and versatility, it is a primary object of the present invention to apply a device independent paradigm to spatial processing in a digital image processing system. This paradigm will capture the spatial characterization of the imaging device in a tagged file format, referred to as a device spatial profile.

SUMMARY OF THE INVENTION

Device profiles conventionally describe properties of a device or element within a digital image processing system that capture, transform or render color components of an image. An improved device profile includes both chromatic characteristic information and spatial characteristic information. The device profile is generated by use of both the measured chromatic response and spatial stimuli and device response within a model based image processing system to predict both color and spatial characteristic functions of an imaging element or device. The device profile generally includes: first data for describing a device dependent transformation of color information content of the image; and second data for describing a device dependent transformation of spatial information content of the image. In a special case, the device profile could contain only spatial characteristic information.

BRIEF DESCRIPTION OF THE DRAWINGS

The aforementioned aspects and other features of the invention are described in detail in conjunction with the accompanying drawings in which the same reference numerals are used throughout for denoting corresponding elements and wherein.

DETAILED DESCRIPTION OF THE PREFERRED EMBODIMENTS

Figure 1:
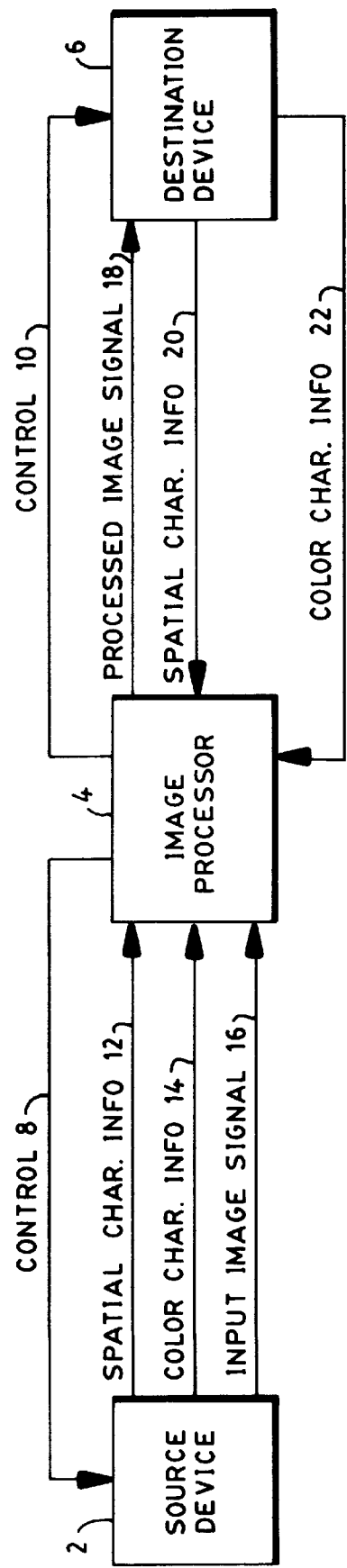
FIG. 1 is a block diagram of a basic digital image processing system according to the invention.

A simplified version of a digital image processing system is shown in the block diagram of FIG. 1. The acquisition device 2, for instance a digital camera, acquires an image which is represented as the input image signal 16. The image processor 4 receives the input image signal 16, acquisition device spatial characteristic information 12 and acquisition device color characteristic information 14 in response to a control signal 8. The image processor 4 also receives output device spatial characteristic information 20 and output device color characteristic information 22 from the output device 6 in response to a control signal 10. After processing the input image signal 16 in accordance with all the signals received by the processor 4, the image processor 4 sends the processed image signal 18 to output device 6, for instance a printer which produces a hardcopy of the processed image.

An image includes both spatial and chromatic information. The spatial content of an image can be described by its signal and noise power distributions. An image's signal or noise power distribution will be transformed by a device but does not give an unique description of the device because the distributions are image specific and they will be determined by the result of all preceding image transformations. However for one class of imaging devices namely linear, stationary imaging systems with additive noise, characteristic functions sufficient to reconstruct the signal and noise power distributions can be constructed. In practice many systems not conforming to these conditions can be approximated as linear, stationary imaging systems with additive noise having sufficient accuracy to enable the prediction of perceived image quality if not full image reconstruction.

Spatial characteristics of the elements of an image processing system or platform can be represented in at least two forms. In a first form, a characteristic processing section 30 of the image processing platform contains spatial characteristic functions describing added noise and image signal transform characteristics of the source and destination devices. In practice these image signal transform characteristics are represented by mid-tone Wiener Noise Spectra and small signal Modulation Transfer Functions measured in the mid-tone domain. In a second form, the characteristic processing section 30 contains spatial characteristic functions describing a gray level dependent additive noise in the source device. The latter form is directed towards the method(s) described in U.S. patent application Ser. No. 08/440,639 filed May 15, 1995 for noise reduction using a Wiener variant filter in a pyramid image representation. This patent application is hereby incorporated in its entirety to provide supplemental background information which is non-essential but helpful in appreciating the applications of the present invention.

Figure 2:
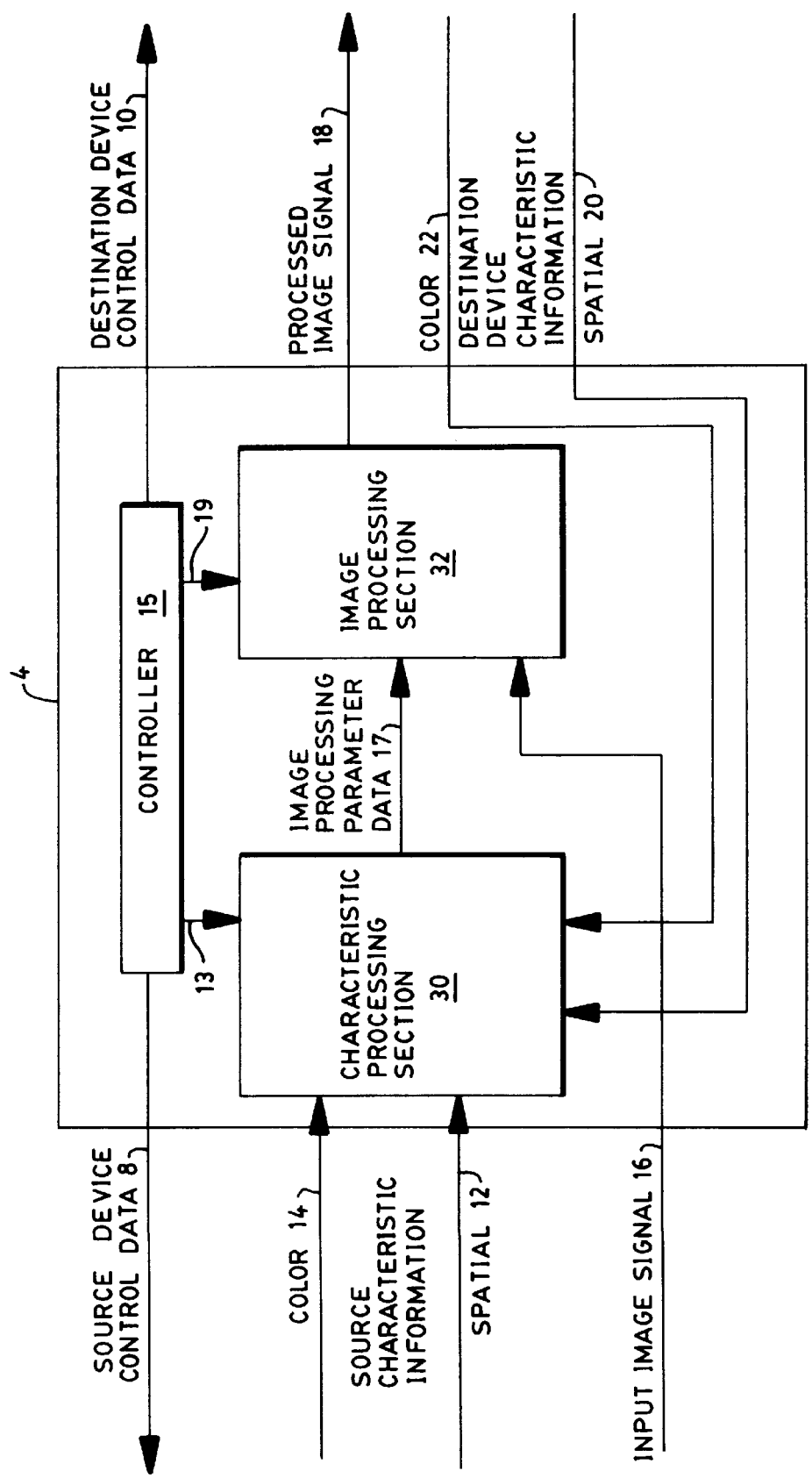
FIG. 2 is a detailed block diagram of the image processor of FIG. 1.

FIG. 2 is a detailed diagram of the image processor 4 of FIG. 1. The image processor 4 includes a controller 15, a characteristic processing section 30 and an image processing section 32. The characteristic processing section 30 produces image processing data 17 in response to color source characteristic information 14, spatial source characteristic information 12, color destination device characteristic information 22, spatial destination device characteristic information 20, and a first control signal 13 from the controller 15. In turn, the image processing section 32 produces a processed image signal 18 in response to the image processing parameter data 17, an input image signal 16 and a second control signal 19 from the controller 4. The controller 15 also generates both source device control data 8 and destination device control data 10.

Figure 3:
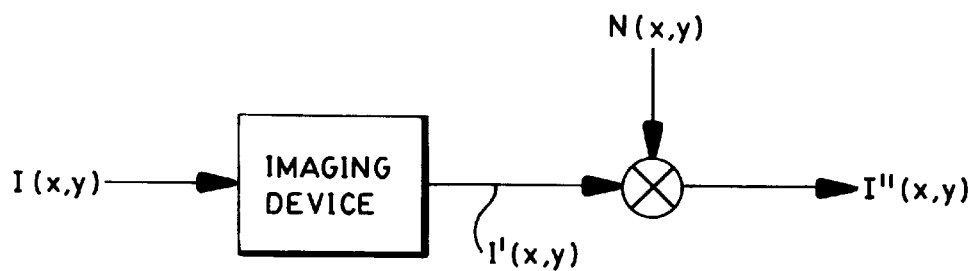
FIG. 3 is a model of characteristic functions sufficient to reconstruct signal and noise power distributions for linear, stationary image systems having additive noise.

If I(x,y) represents the intensity distribution over the spatial coordinates (x,y) of the image and I(u,v) represents the corresponding frequency domain representation of the image constructed from the Fourier transform of I(x,y), then the transformation of the image by a linear, stationary imaging element can be represented as shown in FIG. 3. In the spatial domain the transformation is described by a Linear function S(g(x,y)):

$$I'(x,y)=S(I(x,y)) \tag{1}$$

$$I''(x,y)=S(I(x,y)+N(x,y)) \tag{2}$$

and in the Fourier (spatial frequency) domain by the Fourier Transform S(G(u,u)) of S(g(x,y)):

$$I(u,v)=S(I(u,v)) \tag{3}$$

$$I''(u,v)=S(I(u,v)+N(u,v)) \tag{4}$$

where N(x,y) and its corresponding Fourier Transform N(u,v) represents the additive noise.

For a linear, stationary imaging system, the transfer function S(g(x,y)) is given by $$S(g(x,y))=s(x,y) \otimes g(x,y) \tag{5}$$

where $\otimes$ signifies convolution. S(G(u,v)) is given by:

$$S(G(u,v))=S(u,v)*G(u,v) \tag{6}$$

where * signifies point multiplication.

In principle S(u,v) can be computed from the ratio of the output/input signal power distributions. In practice, S(u,v) is determined from fourier analysis of images of step input images via edge gradient analysis, or point or line images via point or line spread analysis. The transfer function is commonly called the Modulation Transfer Function (MTF).

If the input image is an uniform image $I(x,y)=I_0$, Fourier analysis of the output image will yield the Wiener Noise Power Spectrum N(u,v) which is the characteristic function for the imaging device describing the noise added to the image during its transformation through the imaging device.

As stated previously, most real systems violate the criteria for being linear and stationary; and while introducing additive noise, that noise is often gray level dependent. This type of noise is referred to as non-linear, non-stationary, gray level dependent additive noise.

If a number of uniform field images, each described by a constant intensity $I_y$ (where Y represents the luminance level) are processed by a device, Fourier analysis of the output images will yield Wiener Noise Power Spectra $N_y(u,v)$. The set of gray level dependent Wiener Noise Power Spectra represents the characteristic function for the imaging device describing the noise added to the image during its transformation through the imaging device.

For non-linear image transforms a set of signal level dependent MTFs could, in principle, be generated to represent the characteristic functions describing the signal transform in the imaging device. In practice a single characteristic function can be generated from an ensemble average of MTFs or a small signal approximation. In general all of these characteristic functions are two-dimensional functions which are represented as M(u,v).

For non-stationary image transforms the image signal transform characteristic function can, in principle, be represented by a multi-dimensional function, M(x,y,u,v), generated from a local fourier analysis of the point spread function located at the position (x,y). In practice the characteristic function can be approximated by an ensemble average of the position dependent multi-dimensional function M(x,y,u,v).

$$M(u,v)=<M(x,y,u,v)>_{xy} \tag{7}$$

where the operation $<M(x,y,u,v)>_{xy}$ is a weighted average of the function M(x,y,u,v) over the spatial coordinates x,y.

Figure 4:
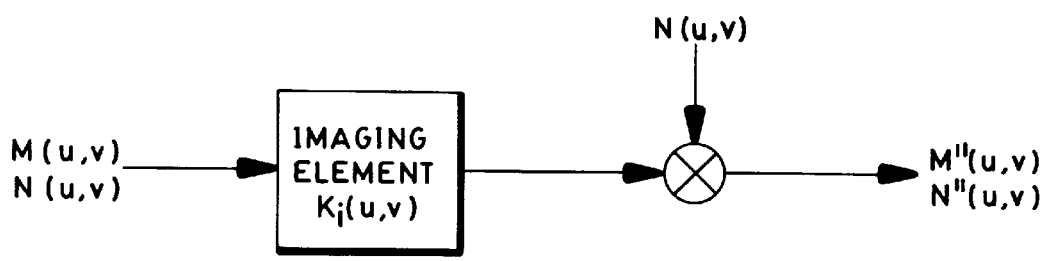
FIG. 4 is a model of the effect of an image processing element upon an image.

The processing of spatial characteristic functions in the image processing system of the preferred embodiment is model based. For a linear imaging system with additive noise, each image processing element is represented by a transfer function that is a model of the effect of that image processing element upon an image as shown in FIG. 4 and defined by equations (7) and (8) in the frequency domain.

$$M''(u,v)=Ki(u,v)*M(u,v) \tag{8}$$

$$N''(u,v)=Ki^2(u,v)*N(u,v)+Ni(u,v) \tag{9}$$

For non-linear imaging elements, the transfer function may be a more general representation of the characteristic functions presented to the imaging element and evaluated in terms of a model of the imaging element.

Spatial characteristic functions are generated from fourier analysis of selected target images. Characteristic functions (a) may be scalar, one or two dimensional arrays for at least one of the device N channels, (b) are evaluated over the spatial frequency range 0 to the Nyquist frequency in equal frequency intervals, and (c) for source devices may be stated either in a proprietary processing space or in device independent space.

In the present invention, spatial characteristic functions are incorporated into device profiles. These spatial characteristic functions have been coded as private tags attachable to the well known International Color Consortium (ICC) profile format, as described in the ICC Profile Specification, version 3. 10b dated Oct. 21, 1995. The tagged format should include information as to which class the particular characteristic function belongs, i.e. Modulation Transfer Functions, Wiener Noise Power Spectra, or gray level dependent Wiener noise masks. The tagged format should also include information sufficient to identify both the relevant units of spatial frequency and the dimensionality of the characteristic functions. Propagation of characteristic functions is calculated within the context of the model based image processing system.

It is to be understood that the above described embodiments are merely illustrative of the present invention and represent a limited number of the possible specific embodiments that can provide applications of the principles of the invention. Numerous and varied other arrangements may be readily devised in accordance with these principles by those skilled in the art without departing from the spirit and scope of the invention as claimed.

What is claimed is:

1. A device profile for describing properties of a device in a digital image reproduction system to capture, transform or render an image, said device profile comprising:

first data for describing a device dependent transformation of color information content of the image to a device independent color space; and second data for describing a device dependent transformation of spatial information content of the image in said device independent color space.

2. The device profile of claim 1 wherein, for said device, the second data is represented by a first characteristic function describing added noise characteristics and a second characteristic function describing image signal transform characteristics.

3. The device profile of claim 2, wherein said added noise characteristics are represented by a Wiener Noise Spectrum and said image signal transform characteristics are represented by a Modulation Transfer Function.

4. The device profile of claim 1, wherein the second data is represented by characteristic functions describing a gray level dependent additive noise in said device.

5. The device profile of claim 1, wherein said gray level dependent additive noise is represented by Wiener Noise Spectra.

6. The device profile of claim 5, wherein said gray level dependent additive noise is spatially dependent.

7. The device profile of claim 1, wherein the second data is represented by characteristic functions describing spatially dependent additive noise in said device.

8. The device profile of claim 7, wherein said spatially dependent additive noise is represented by Wiener Noise Spectra.

9. The device profile of claim 1 wherein, for said device, the second data is generated through use of spatial stimuli and device response characteristic functions.

10. A method of generating a device profile that describes properties of a device in a digital image reproduction system for capturing, transforming or rendering an image, said method comprising:

generating first data for describing a device dependent transformation of color information content of the image to a device independent color space through use of measured chromatic stimuli and device response characteristic functions;

generating second data for describing a device dependent transformation of spatial information content of the image in said device independent color space through use of spatial stimuli and device response characteristic functions; and combining said first and second data into the device profile.

11. The method of claim 10 wherein, for said device:

said second data is represented by a first characteristic function describing added noise characteristics and a second characteristic function describing image signal transform characteristics.

12. The method of claim 11 wherein, for said device, said added noise characteristics are represented by a Wiener Noise Spectrum and said image signal transform characteristics are represented by a Modulation Transfer Function.

13. The method of claim 11 wherein the second data is represented by characteristic functions describing a gray level dependent additive noise in said device.

14. The method of claim 11, wherein said gray level dependent additive noise is represented by Wiener Noise Spectra.

15. The method of claim 13, wherein said gray level dependent additive noise is spatially dependent.

16. The method of claim 11, wherein the second data is represented by characteristic functions describing spatially dependent additive noise in said device.

17. The method of claim 16, wherein said spatially dependent additive noise is represented by Wiener Noise Spectra.

18. A digital image processing system using a device profile for describing properties of a device in the system to capture, transform or render an image, said system comprising:

means for utilizing first data of the device profile for describing a device dependent transformation of color information content of the image to a device independent color space through use of chromatic response characteristic functions; and means for utilizing second data of the device profile for describing a device dependent transformation of spatial information content of the image in said device independent color space through the use of spatial characteristic fimctions describing image spatial transform characteristics in said device independent color space.

19. The system of claim 18, wherein the second data is represented by a first characteristic function describing added noise characteristics and a second characteristic function describing image signal transform characteristics.

20. The system of claim 19, wherein said added noise characteristics are represented by a Wiener Noise Spectrum and said image signal transform characteristics are represented by a Modulation Transfer Function.

21. The system of claim 18, wherein the second data is represented by characteristic functions describing a gray level dependent additive noise in said device.

22. The system of claim 18, wherein said gray level dependent additive noise is represented by Wiener Noise Spectra.

23. The system of claim 22, wherein said gray level dependent additive noise is spatially dependent.

24. The system of claim 18, wherein the second data is represented by characteristic functions describing spatially dependent additive noise in said device.

25. The system of claim 24, wherein said spatially dependent additive noise is represented by Wiener Noise Spectra.

26. A device profile for describing properties of a device in a digital image reproduction system to capture, transform or render an image, said device profile comprising data for describing a device dependent transformation of spatial information content of the image to a device independent color space, wherein through use of spatial stimuli and device response for said device, said data is represented by spatial characteristic functions.

27. The device profile of claim 26 wherein, for said device, the data is represented by a first characteristic function describing added noise characteristics and a second characteristic function describing image signal transform characteristics.

28. The device profile of claim 27, wherein said added noise characteristics are represented by a Wiener Noise Spectrum and said image signal transform characteristics are represented by a Modulation Transfer Function.

29. The device profile of claim 26, wherein the data is represented by characteristic functions describing a gray level dependent additive noise in said device.

30. The device profile of claim 26, wherein said gray level dependent additive noise is represented by Wiener Noise Spectra.

31. The device profile of claim 30, wherein said gray level dependent additive noise is spatially dependent.

32. The device profile of claim 26, wherein the data is represented by characteristic functions describing spatially dependent additive noise in said device.

33. The device profile of claim 32, wherein said spatially dependent additive noise is represented by Wiener Noise Spectra.

* * * * *